United States Patent  
Chen et al.

(10) Patent No.: US 6,684,206 B2
(45) Date of Patent: Jan. 27, 2004

(54) OLAP-BASED WEB ACCESS ANALYSIS METHOD AND SYSTEM

(75) Inventors: Qiming Chen, Sunnyvale, CA (US); Umeshwar Dayal, Saratoga, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 211 days.

(21) Appl. No.: 09/861,452

(22) Filed: May 18, 2001

(65) Prior Publication Data

US 2003/0046303 A1 Mar. 6, 2003

(51) Int. Cl.[7] .............................................. G06F 17/30
(52) U.S. Cl. .............................................. 707/3; 707/6
(58) Field of Search .............................. 707/1, 2, 3, 4, 707/5, 6, 10, 100, 102; 705/1, 4, 35, 38; 706/11, 12; 379/88.19, 189

(56) References Cited

U.S. PATENT DOCUMENTS 6,385,301 B1 * 5/2002 Nolting et al. ............ 379/32.01

OTHER PUBLICATIONS

Osmar R. Zaiane, Man Xin, Jiawei Han Discovering Web Access Patterns and Trends by Applying OLAP and Data Mining Technology on Web Logs. Proc. Advances in Digital Libraries, Santa Barbara, Apr. 1998.*

* cited by examiner

Primary Examiner—Diane D. Mizrahi
Assistant Examiner—Yicun Wu

(57) ABSTRACT

A method and system for analyzing web access. First, a plurality of web log records are received. Next, multi-dimensional summary information is generated based on the web log records. Then, derivation and analysis are performed to discover usage patterns and rules for supporting business intelligence by using the multi-dimensional summary information.

7 Claims, 5 Drawing Sheets

OLAP-BASED WEB ACCESS ANALYSIS METHOD AND SYSTEM

FIELD OF THE INVENTION

The present invention is generally related to data mining, and in particular, a method and system for efficiently mining web log records (WLRs).

BACKGROUND OF THE INVENTION

Commercial web sites typically generate large volumes of web log records (WLRs) on a daily basis. Collecting and mining web log records (WLRs) from e-commerce web sites have become increasingly important for targeted marketing, promotions, and traffic analysis. Because an active web site may generate hundreds of millions of WLRs daily, any web-related data mining application must deal with huge data volumes and high data flow rates.

These WLRs can be collected and mined to extract customer behavior patterns, which may then in turn be used for a variety of business purposes. These business purposes can include, for example, making product recommendations, designing marketing campaigns, or re-designing a web site. In order to support fine-grained analysis, such as determining individual users' access profiles, these data mining applications must handle huge, sparse data cubes that are defined over very large-sized dimensions. For example, there may be hundreds of thousands of visitors to a particular site of interest, and tens of thousands of pages associated with the web site of interest.

Numerous commercial tools are available for analyzing WLRs and records from other data sources and generating reports for business managers. Two examples of such commercial tools are the WebTrends product (see http://www.webtrends.com) and the NetGenesis product (see http://www.netgenesis.com). Unfortunately, these prior art tools have several disadvantages. First, these prior art tools typically provide only a fixed set of pre-configured reports. Second, these prior art tools have limited on-line analytical capabilities. Third, these prior art tools do not support more sophisticated data mining operations, such as customer profiling or association rules.

The inventors have proposed the use of on-line analytical processing (OLAP) tools to support complex, multi-dimensional and multi-level on-line analysis of large volumes of data stored in data warehouses. For example, in a paper entitled, "A Distributed OLAP Infrastructure for E-Commerce", written by Q. Chen, U. Dayal, M. Hsu, Proc. Fourth IFCIS Conference on Cooperative Information Systems (CoopIS'99), United Kingdom 1999, a scalable framework is described that is developed on top of an Oracle-8 based data warehouse and a commercially available multi-dimensional OLAP server, Oracle Express. This scalable framework is used to develop applications for analyzing customer calling patterns from telecommuication networks and shopping transactions from e-commerce sites.

It is desirable to implement a Web access analysis engine on this framework to support the collection and mining of WLRs at the high data volumes that are typical of large commercial Web sites. Unfortunately, there are several challenges (e.g., performance and functionality problems) that must be addressed before such a web access analysis engine can be implemented.

One challenge is how to handle the processing of very large, very sparse data cubes. While a data warehouse/OLAP framework is capable of dealing with huge data volumes, the OLAP framework does not guarantee that the summarization and analysis operations can scale to keep up with the input data rates. Specifically, Web access analysis introduces a number of fine-grained dimensions that result in very large, very sparse data cubes. These very large, very sparse data cubes pose serious scalability and performance challenges to data aggregation and analysis, and more fundamentally, to the use of OLAP for such applications.

While OLAP servers generally store sparse data cubes quite efficiently, OLAP servers generally do not roll-up these sparse data cubes very efficiently. For example, while most MOLAP and ROLAP engines provide efficient mechanisms for caching and storing sparse data cubes, the engines lack efficient mechanisms for rolling-up such cubes. As illustrated in the example set forth herein below, the time required for prior art OLAP engines to roll-up a large sparse data cube can take prohibitively long. For example, the processing time required for prior art OLAP engines to roll-up a large sparse data cube can far exceed the minimum time between the receipt of a first data set and the receipt of new data set. As can be appreciated, if the time needed to process and summarize the first data set exceeds the time between the receipt of the first data set and the receipt of the new data set, the system can never keep up with the new data.

For example, in one application, a newspaper Web site received 1.5 million hits a week against pages that contained articles on various subjects. The newspaper wanted to profile the behavior of visitors from each originating site at different times of the day, including their interest in particular subjects and which referring sites they were clicking through. The data is modeled by using four dimensions: ip address of the originating site (48,128 values), referring site (10,432 values), subject uri (18,085 values), and hours of day (24 values). The resulting cube contains over 200 trillion cells, indicating clearly that the cube is extremely sparse. Each of the dimensions participates in a 2-level or 3-level hierarchy. To rollup such a cube along these dimension hierarchies by using the regular rollup operation supported by the OLAP server requires an estimated 10,000 hours (i.e. more than one year) on a single Unix server. As can be appreciated, the processing time required is unacceptable for the application.

Accordingly, mechanisms are desired that can efficiently summarize data without having to roll-up sparse data cubes. Unfortunately, the prior art approaches fail to offer these mechanisms.

Based on the foregoing, a significant need remains for a system and method for efficiently analyzing web log records.

SUMMARY OF THE INVENTION

According to one embodiment of the present invention, a method for analyzing web access is provided. First, a plurality of web log records is received. Next, multi-dimensional summary information is generated based on the web log records. Then, derivation and analysis are performed to discover usage patterns and rules for supporting business intelligence by using the multi-dimensional summary information.

According to another embodiment of the present invention, a system for analyzing web access is provided. The system has a source of web log records and an OLAP engine. When executing a web access analysis program, the OLAP engine receives a plurality of web log records, generates multi-dimensional summary information based on the web log records, and performs derivation and analysis to discover usage patterns and rules for supporting business intelligence by using the multi-dimensional summary information.

Preferably, the web access analysis program includes a feature ranking facility for generating multilevel and multidimensional feature ranking cubes for ranking web access along multiple dimensions and at multiple levels. For example, the feature ranking facility generates a first cube for ranked list of elements of a particular dimension, where a feature is represented by a dimension, and a second cube for one of volume and probability distribution corresponding to the ranked list of elements of a particular dimension.

The web access analysis program can also include a correlation analysis facility for performing correlation analysis on the summary information to generate association rules for use in web access analysis. For example, the correlation analysis facility can generate multilevel association rules with flexible base and dimensions or time-variant association rules.

The web access analysis program can also include a direct binning facility for concurrently generating a volume cube based on the plurality of web log records and directly generating a high diagonal cube based on the plurality of web log records.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

A system and method for mining web log records to extract customer behavior patterns are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The present invention provides a scalable data warehousing and OLAP-based engine for analyzing web log records (WLRs) that overcomes scalability and performance challenges discussed previously. Mechanisms are provided by the present invention for tackling scalability issues related to web access analysis and for dealing with very large, sparse cubes. The web access analysis method and system of the present invention employs high-diagonal cubes to replace the prior art embedded-total cubes in which all intermediate summaries all the way to the top of each dimension hierarchy are computed at load time. The present invention employs a direct binning facility to directly populate the high-diagonal cubes instead of a roll-up operation utilized by the prior art. The computation load is further reduced by the present invention by selecting high-profile dimension elements. The mechanisms provided by the present invention allow us to speed up Web log analysis by three orders of magnitude as compared to prior art approaches. The present invention provides bookkeeping to maintain the relationships between the high-level data cubes containing aggregates and the low-level data cubes containing detailed data, thereby allowing users to drill-down selectively.

OLAP Based Web Access Infrastructure 100

Almost all e-commerce applications are Web based. Web log records (WLRs) are generated to represent information specific to each Web access attempt. Each WLR typically contains, among other things, the IP address of origin site, the access time, the referring site, the URI of the target site (i.e., the Web page or object accessed), the browser method and protocol used. A partial WLR is shown in TABLE I.

TABLE I

| WLR FIELD | VALUE |
| --- | --- |
| IP address | 200.41.15.125 |
| time | 24/Oct/1999:22:45:33 +0100 |
| request | GET/EXP/TODAY/dicount.html HTTP/1.1 |
| status | 200 |
| content length | 1148 |
| referring site | www.exp.com/EXP/FUN/funds.html |
| agent | Mozilla/4.0 (compatible; MSIE 4.01; Windows 98) |
| method | GET |
| uri | www.exp.com/EXP/TODAY/dicount.html |
| protocol | HTTP/1.1 |

Figure 1:
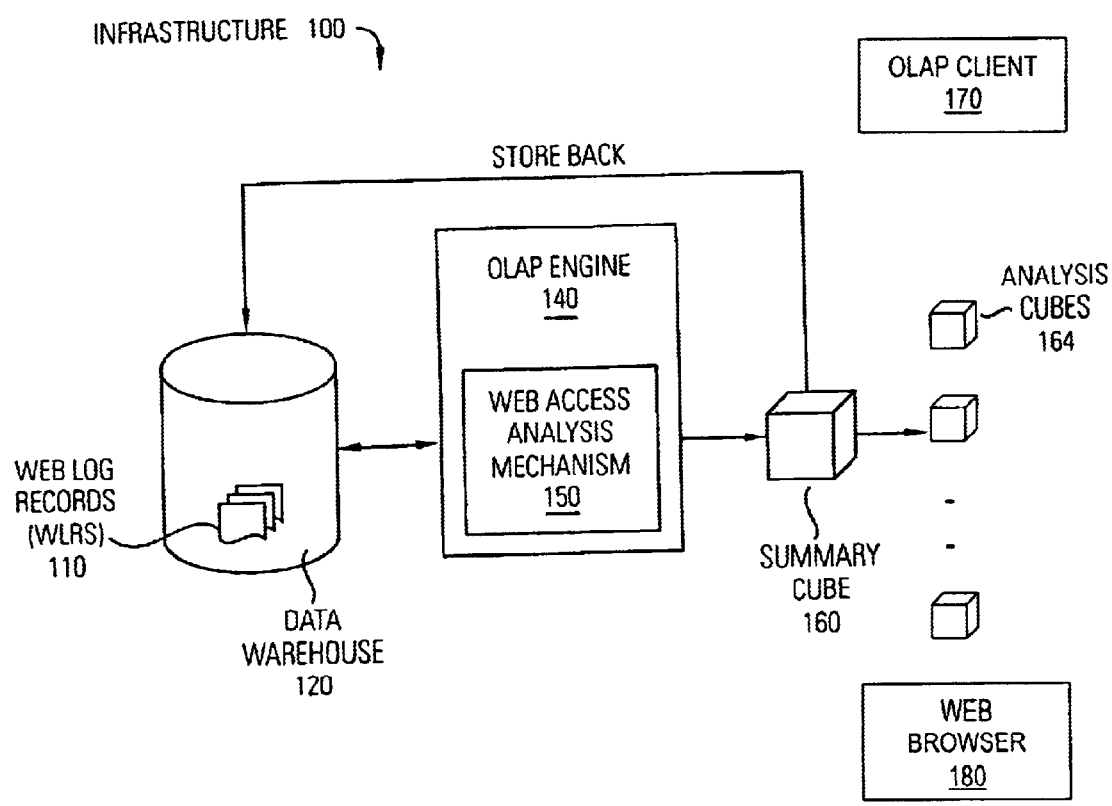
FIG. 1 is a block diagram of an OLAP-based infrastructure for performing web access analysis configured in accordance with one embodiment of the present invention.

FIG. 1 is a block diagram of an OLAP-based infrastructure 100 for performing web access analysis configured in accordance with one embodiment of the present invention. The infrastructure 100 includes a source 120 of web log records (WLRs) 110. The source 120 can be, for example, a data warehouse. The WLRs 110 may be kept in log files, or stored in a data warehouse 120 together with other reference data. In the latter case, WLRs 110 are fed to the data warehouse 120 periodically or continuously, and retired to archive after use under certain data staging control.

The infrastructure 100 includes an OLAP engine 140 that has mechanisms to automate the entire operation chain from loading WLRs to computing summaries, patterns and rules, and posting the results on the Web by using OLAP programming.

The OLAP engine 140 also includes a web access analysis mechanism 150 for supporting the computation of summary cubes and multidimensional and multi-level patterns and rules based on both volume and probability distributions for use in web access analysis. The resulting summary cubes are stored back in the data warehouse 120, and reloaded into the OLAP engine 140 for incremental update.

The web access analysis mechanism 150 generates one or more summary cubes 160. The summary cubes 160 can be utilized to generate one or more analysis cubes 164 (e.g., feature ranking cubes and association rule cubes). It is noted that the analysis cubes 164 can be viewed by utilizing an OLAP client 170. Furthermore, the analysis cubes 164 may be viewed by utilizing a web browser 180 when the analysis cubes 164 are first transformed into an HTML format.

Web access analysis mechanism 150

Figure 2:
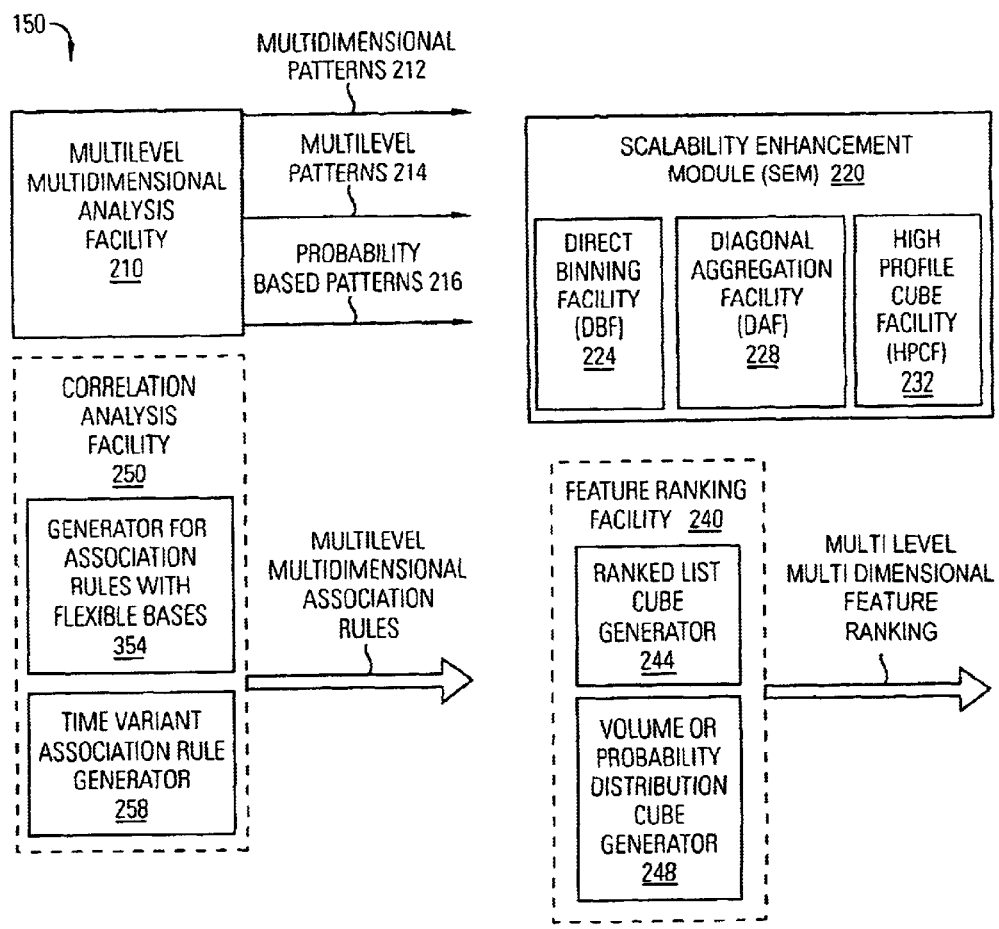
FIG. 2 is a block diagram illustrating in greater detail the web access analysis mechanism of FIG. 1.

FIG. 2 is a block diagram illustrating in greater detail the web access analysis mechanism 150 of FIG. 1. The web access analysis mechanism 150 includes a multilevel, multidimensional analysis facility 210 for generating multidimensional patterns 212, multilevel patterns 214, and probability distribution based patterns 216. Multilevel, multidimensional analysis is described in greater detail hereinafter.

The web access analysis mechanism 150 includes a scalability enhancement module (SEM) 220 for efficiently summarizing data. The scalability enhancement module 220 includes a direct binning facility (DBF) 224 for concurrently generating a volume cube based on the plurality of web log records and directly generating a high diagonal cube based on plurality of web log records.

The scalability enhancement module 220 also includes a diagonal aggregation facility (DAF) 228 for using a high diagonal cube to perform diagonal aggregation without rollup. The scalability enhancement module 220 includes a high profile cube facility (HPCF) 232 for generating high profile cubes. The use of direct binning, diagonal aggregation, and high profile cubes to enhance scalability are described in greater detail hereinafter.

The web access analysis mechanism 150 includes a feature ranking facility 240 for generating multilevel and multidimensional feature ranking cubes for ranking web access along multiple dimensions and at multiple levels. The feature ranking facility 240 includes a ranked list cube generated 244 for generating a first cube for ranked list of elements of a particular dimension, where a feature is represented by a dimension. The feature ranking facility 240 also includes a volume/probability distribution cube generator 248 for generating a second cube (e.g., a volume cube or probability distribution cube) corresponding to the ranked list of elements of a particular dimension. Feature ranking is described in greater detail hereinafter.

The web access analysis mechanism 150 includes a correlation analysis facility 250 for performing correlation analysis on the summary information to generate association rules for use in web access analysis. The correlation analysis facility 250 includes a generator 254 for generating multilevel association rules with flexible base and dimensions. The correlation analysis facility 250 also includes a generator 258 for generating time-variant association rules. Correlation analysis is described in greater detail hereinafter.

Processing Steps

Figure 3:
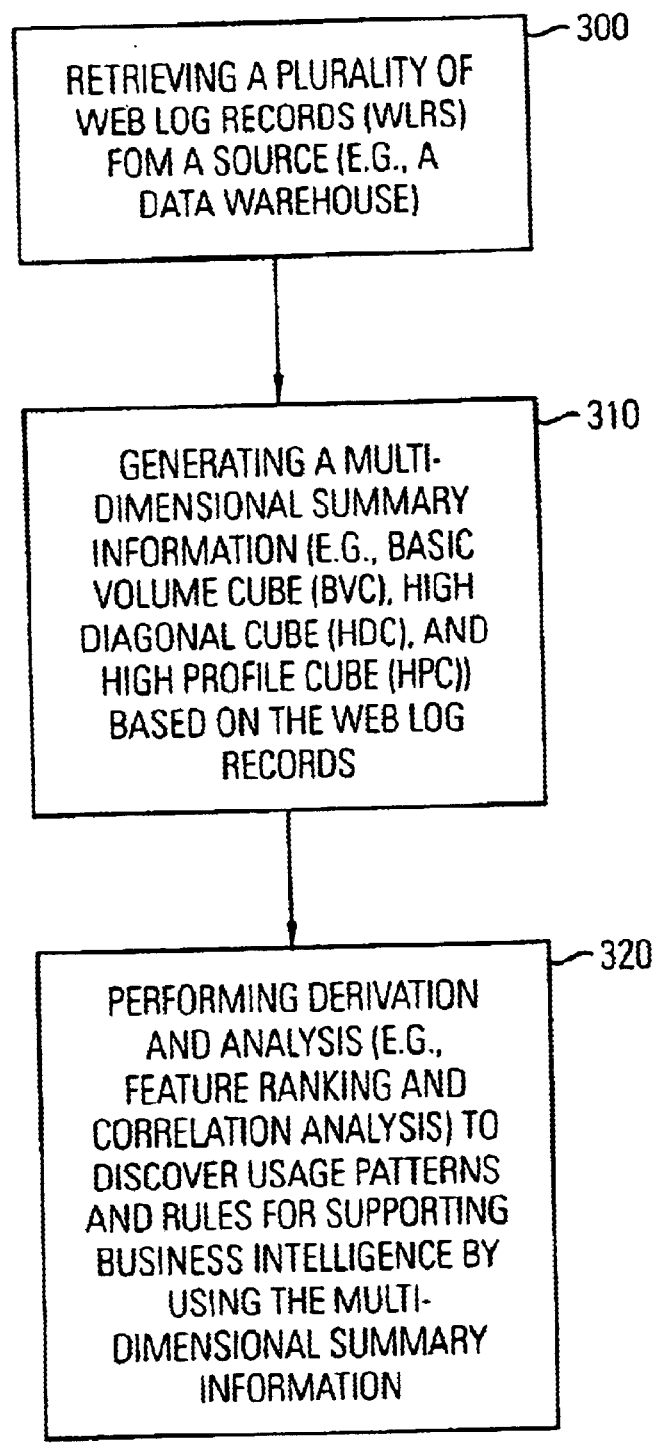
FIG. 3 is a flow chart illustrating the steps performed by the web access analysis mechanism in accordance with one embodiment of the present invention.

FIG. 3 is a flow chart illustrating the steps performed by the web access analysis mechanism in accordance with one embodiment of the present invention. In step 300, a plurality of web log records is received from a source, such as a data warehouse. In step 310, multi-dimensional summary information is generated based on the web log records. As described in greater detail hereinafter the multi-dimensional summary information can be in the form of a basic volume cube (e.g., BVC 410 of FIG. 4), a high diagonal cube (e.g., HDC 420 of FIG. 4), and a high profile cube (e.g., HPC 430 of FIG. 4).

In step 320, derivation and analysis are performed to discover usage patterns and rules for supporting business intelligence by using the multi-dimensional summary information. As described in greater detail hereinafter the derivation and analysis can include feature ranking and correlation analysis.

In summary, the web access analysis method and system of the present invention performs two primary tasks for Web access analysis. First, the web access analysis method and system of the present invention computes multi-dimensional summary information from a number of raw WLRs. Second, the web access analysis method and system of the present invention derive usage patterns and rules for supporting business intelligence.

Some examples of derivation and analysis include usage analysis, web traffic analysis, and business rules discovery. Usage analysis involves determining the volume and distribution of hits for specific topics, dimensioned by origin site, referring site and time at multiple levels. For example, the results of usage analysis can be used as quantitative measures for personalizing the delivery of content to customers in different areas and at different times.

Web site traffic analysis involves determining the volume and distribution of hits for target sites, dimensioned by referring site and time. The results of web site traffic analysis can be used for resource and network planning to improve quality of service (e.g., distributing workload over multiple sites, creating mirror sites, or caching content).

Business rules discovery involves determining the change of access rates to a Web site. The results of business rules discovery can be used to provide indications of changing customer interests and behavior. For instance, the correlation between a content topic and certain origin sites in an area describes the interest of the customers in that area. While such relationships are helpful for making marketing promotion decisions, the changes in such relationships may be even more significant, since such changes usually reflect real-time trends of changes in customers' interest, reactions to a marketing campaign, as well as the impact of competitors. The present invention has mechanism to identify such relationships by mining for association rules continuously and incrementally.

The present invention can measure Web access in terms of volumes and probability distributions, which are expressed in the form of data cubes. A cube C has a set of underlying dimensions D1, . . . , Dn, and is used to represent a multidimensional measure. Each cell of the cube is identified by one element value from each of the dimensions, and contains a value of the measure. A measure is dimensioned by D1, D2, . . . , Dn. The set of elements of a dimension D, which is referred to as the domain of D, may be limited (e.g., by an OLAP limit operation) to a subset. A sub-cube (e.g., slice or dice) can be derived from a cube C by dimensioning C by a subset of its dimensions or by limiting the domains of its dimensions.

For example, a cube measuring Web hit volumes is dimensioned by the IP addresses of origin sites, the target URI, the referring sites, and hours in a day, as define EXPvolume variable int <hour ip ref uri>.

In designing the dimensions of the cube, the finest level of granularity may be selected to suit a particular type of analysis. For example, in this application, "hours" is selected as the finest time granularity, even though the raw WLRs contain time data at an even finer granularity (e.g., seconds). The mapping between the fields of the WLR and the corresponding dimension values is referred to as binning and illustrated in TABLE II.

TABLE II

| WLR FIELD | WLR FIELD VALUE | CUBE DIMENSION | CUBE CELL DIMENSION ELEMENTS |
| --- | --- | --- | --- |
| IP address | 200.41.15.125 | Ip | 200 41.15 125 |
| Time | 24/Oct/1999 22:45:33 +0100 | Hour | 22 |
| referring site | www.exp.com/EXP/FUN/funds.html | Ref | www exp.com/EXP/FUN/funds.html |
| uri | www.exp.com/EXP/TODAY/discount.html | Uri | www.exp.com/EXP/TODAY/dicount.html |

Various cubes can be derived from the above basic cube as formulas. The ability to use formulas to define measures over a multi-dimensional space is a powerful feature of OLAP tools. Further, cubes can computed from other cubes with OLAP programming, namely, by executing programs written in an OLAP language, such as scripts provided by the OLAP engine. In one embodiment, the infrastructure 100 is built on top of an Oracle-8 based data-warehouse and an Oracle Express OLAP server.

Elements of a dimension may form a hierarchy. A hierarchical dimension D contains elements at different levels of abstraction. Associated with D there are a dimension DL describing the levels of D, a relation DL_D mapping each value of D to the appropriate level, and a relation D_D mapping each value of D to its parent value (the value at the immediate upper level). To rollup cube C along dimension D, the measure value at a higher level is the total of the measure values at the corresponding lower levels. A cube may be rolled up along multiple dimensions.

In the application described herein, consider origin, subject, refsite as high-level dimensions of ip, uri, ref, respectively. In Oracle Express, the mappings between them can be defined by relations origin_ip, subject_uri and refsite_ref. Below are some exemplary mappings.

ip:63.211.140.164→origin: CA
uri:www.exp.com/TODAY/
   topstory.html→subject:www.exp.com/TODAY/
ref:www.yahoo.com/entertaintment/book/book-
   store→refsite:www.yahoo.com/

In the traditional OLAP approach, one defines a cube with multiple hierarchical dimensions, where each dimension has elements at more than one level. For example, one can define a dimension from-site with elements at ip level and origin level, drawn from dimensions ip and origin respectively; a to-site dimension with elements at uri level and subject level; and a via-site dimension with elements at ref level and refsite level. The mappings between elements at different levels are based on the relations defined above. Then, a cube recording the volume of hits may be defined as volume <from-site, to-site, via-site, hour>.

When this cube is rolled up over all dimensions, the cube contains all the sub-totals of the original cells for multiple dimensions and at multiple levels. These sub-totals are also referred to as embedded-total. When the original cube has multiple large-sized dimensions, a large number of additional cells are needed to hold the embedded-total. In the above example, these sub-totals occupy approximately 50 trillion cells in the rolled up cube out of a total of 267 trillion cells. Many of these cells have null values. While the OLAP engine is designed to compress sparse cubes for storage, the cells containing nulls must be checked in some way during the rollup operation. Consequently, handling and rolling up such a cube as a whole is impractical.

Scalability Enhancements with Diagonal Aggregation

Figure 4:
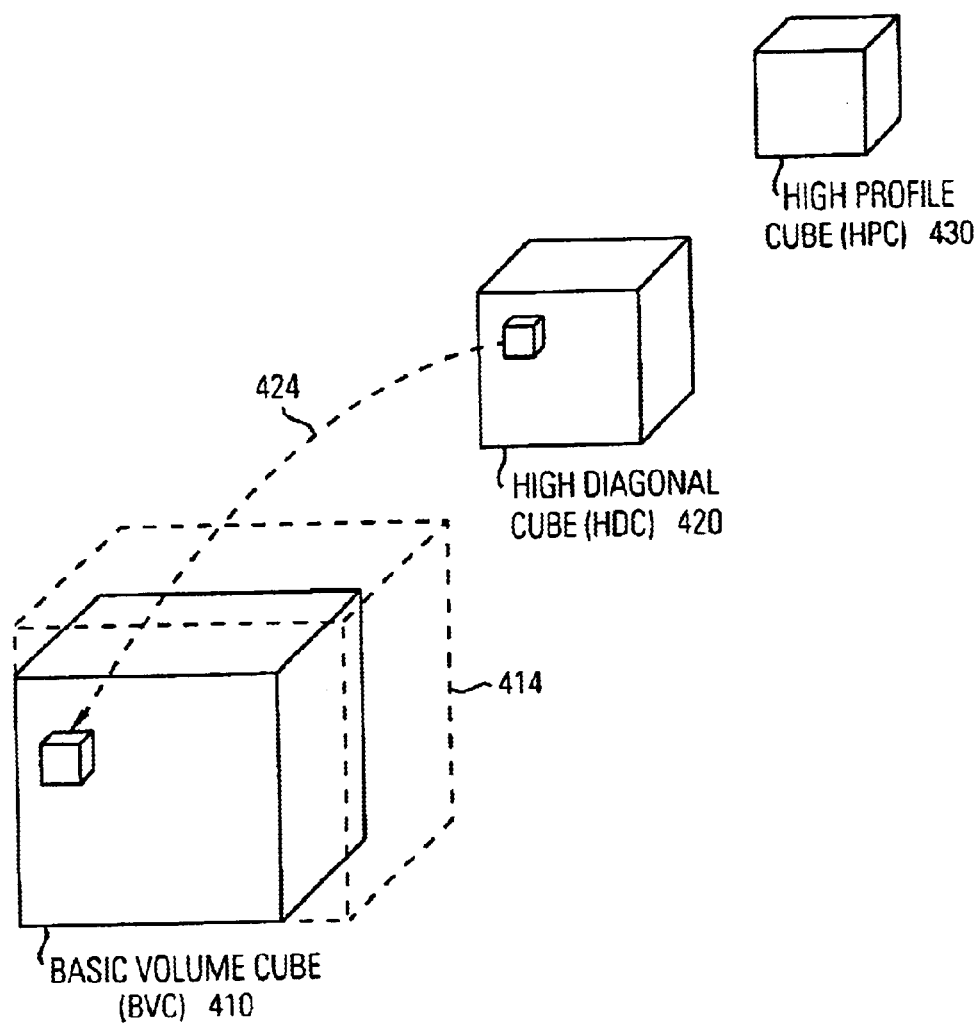
FIG. 4 illustrates different exemplary data cubes that are utilized by the present invention for data aggregation and data reduction.

FIG. 4 illustrates different exemplary data cubes that are utilized by the present invention for data aggregation and data reduction. The present invention solves the above problem by not manipulating a cube with large-sized dimensions as a whole. Instead, the present invention defines another, relatively smaller, cube to hold aggregated values with two basic requirements. The first requirement is that the smaller cube provides a high-level abstraction. The second requirement is that the smaller cube maintains the relationships between dimension elements at different hierarchical levels to enable drill-down.

As shown in FIG. 4, the web access analysis method and system of the present invention represents Web access volumes at basic and aggregate levels by different cubes. These cubes include a Basic Volume Cube (BVC) 410 that is defined to take into account all individual WLRs. The Basic Volume Cube (BVC) 410 may be defined as follows:

EXPvolume variable int <hour sparse <ip ref uri>>.

The diagonal aggregation facility 228 employs a High-Diagonal Cube (HDC) 420 that is defined to represent summary information with respect to the parent dimensions of ip, uri, and ref (i.e., origin, subject, and refsite, respectively), as well as, the hour dimension. There are N to one (N:1) mappings from ip to origin, from uri to subject, and from ref to refsite. The HDC in this example is defined as EXPvolume.high variable int <hour sparse <origin refsite subject>>.

The HDC, Expvolume.high, is a summarization of the corresponding BVC, EXPvolume, aggregated over all dimensions. In this regard, Expvolume.high contains fewer cells than Expvolume, and hence is easier to manipulate with reasonable performance.

A drill down 424 from the HDC 420 to the BVC 410 that is based on query is shown. The portion 414 shown in dashed lines represents the conventional cube rollup. It is noted that the present invention provides diagonal aggregation without the overhead associated with conventional rollup.

It is noted that Expvolume.high does not contain the partial aggregates of Expvolume, (i.e., the aggregates along one or more, but not all dimensions). These aggregates can be selectively generated on demand as query results. For example, to drill down an Expvolume.high cell with www-.yahoo.com as refsite, the relation refsite_ref can be utilized to relate the Expvolume.high cell with www.yahoo.com as refsite to a set of lower-level elements of dimension ref; such as www.yahoo.com/entertainment/book/book-store, which underlie a sub-cube of EXPvolume. Since such query operations involve sub-cubes, these query operations are relatively inexpensive.

Scalability Enhancements with Direct Binning rather than Rollins Up

Since EXPvolume is a sparse cube with large-sized dimensions, generating the derived cube EXPvolume.high from this sparse cube is rather expensive. Conversely, the WLRs, either stored in files or database tables, are not sparse. Often, for each batch load the number of WLRs is much less than the number of cells of the EXPvolume cube. For example, in a typical application, there are millions of WLRs, but the EXPvolume cube has billions of cells.

In this regard, the present invention employs a direct binning facility 224 to populate and update EXPvolume.high directly from log files in order to reduce both the memory load and the computation load as compared with deriving EXPvolume.high from EXPvolume. This mechanism is referred to herein as direct binning.

Figure 5:
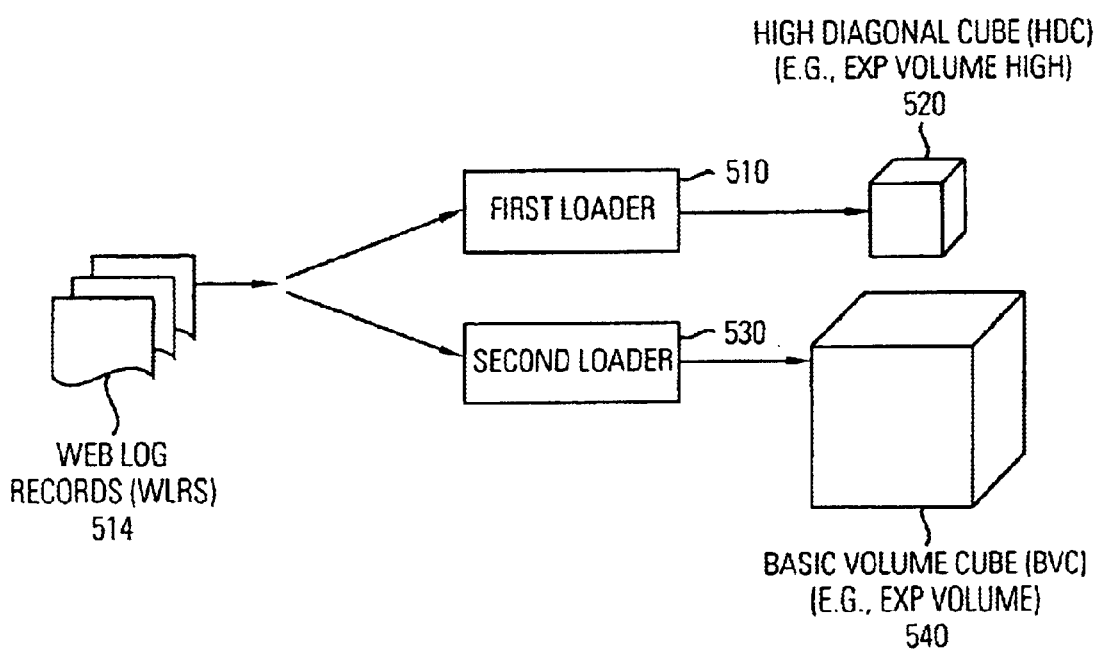
FIG. 5 illustrates a direct binning process for generating a high diagonal cube.

FIG. 5 illustrates a direct binning process for generating a high diagonal cube. A first loader 510 is provided for loading the web log records 514 into a high diagonal cube 520. A second loader 530 is provided for loading the web log records 514 into a basic volume cube 540. It is noted that the web log records are directly loaded into the high diagonal cube 520.

Consider a case where there is a volume cube with k dimensions $D_1, \ldots, D_k$, and each dimension is extended to include a single high-level element 'top'. To populate a summary cube containing the total as well as all the subtotals with respect to each dimension element, each WLR contributes to $$\sum_{i=0}^{k} C_k^i$$

cells, where only one cell is for the base data, all others are for the above total and subtotals. In our example, the EXPvolume.high cube has 4 dimensions, therefore each WRL is used to update $C_4^0+C_4^1+C_4^2+C_k^3+C_k^4=16$ cells during direct binning. For sparse cubes with large dimensions, where the ratio between the numbers of high-level cells and input records falls within a certain range, directly populating high-level cells outperforms rollup.

Scalability Enhancement with High-profile Cubes

The high profile cube facility (HPCF) 232 limits dimension elements to those that underlie cells with large counts to achieve further data reduction. A cube that is defined on the limited dimensions contains fewer cells, and is thus easier to manipulate. Using this approach, some cells containing small or zero counts will be dropped, but these are insignificant for most applications.

In this embodiment, a high-profile cube (HPC) 430 is introduced that is a sub-cube of HDC by taking into account only the high-profile elements of dimensions origin, subject, refsite, (i.e., those elements that correspond to Web access hit rates above a given threshold). The HPC in this example is defined as EXPvolume.top variable int <hour sparse <toporigin toprefsite topsubject>>.

The high-profile elements of a dimension are identified in the following way. Given a volume cube $C[D_1, \ldots, D_n]$ that measures hit counts, a dimension $D_j \in \{D_1, \ldots, D_n\}$, a filter ratio $0 \leq k \leq 1$ with respect to the average count over the element of $D_j$, the threshold t is defined by the ratio of average counts per element of dimension $D_j$, as total(C)/(size($D_j$) * k), where total(C) is the total counts of hits, and size($D_j$) is the number of elements in $D_j$. Those elements of $D_j$ with subtotal counts over the threshold are considered "high-profile" ones. For example, for cube EXPvolume.high, the total counts can be calculated by the following expression:

EXPtotal=total(EXPvolume.high).

Dimensioned totals can be calculated by the following expressions:

EXPbyorigin=total(EXPvolume.high, origin)
//dimensioned by origin

EXPbysubject=total(EXPvolume.high, subject)
//dimensioned by subject

EXPbyrefsite=total(EXPvolume.high, refsite)
//dimensioned by refsite.

Then, for example, the threshold for dimension origin is determined by threshold.origin=EXPtotal/size (origin) * k.

The high-profile elements of origin are extracted by limit origin to EXFbyOrigin>threshold.origin and then loaded to a separate dimension toporigin.

The elements of dimension toporigin, topsubject and toprefsite are subsets of those of origin, subject and refsite respectively. Therefore, total hits and their probability distributions must be calculated over EXPvolume.high for accuracy.

Web Usage Analysis

The Web usage analysis method and system of the present invention supports an automatic process from loading Web logs to generating Web pages for presenting multidimensional and multilevel analysis results. The present invention employs an OLAP engine (e.g., an Oracle Express OLAP), as a scalable computation engine. Furthermore, the present invention employs cubes, together with dimensions, (binary) relations, etc., to represent data objects. Moreover, the present invention employs OLAP scripts as a high-level programming language for implementing tasks that range from building cubes, mining rules, to coding dynamic HTML pages. Examples of Web usage analysis functions supported by the Web usage analysis method and system of the present invention are now described. Specifically, multilevel and multidimensional analysis, multilevel and multidimensional feature ranking, and correlation analysis are now described.

Multilevel and Multidimensional Analysis

In one embodiment, the present invention generates cubes that represent multidimensional Web access volumes at three levels: 1) the basic level, 2) the summary level, and 3) the top level. TABLE III illustrates exemplary cubes and dimensions at multiple levels.

TABLE III

| CUBE | DIMENSIONS | | | |
| --- | --- | --- | --- | --- |
| EXPvolume | ip | ref | uri | hour |
| EXPvolume.high | origin | refsite | subject | hour |
| EXPvolume.top | toporigin | toprefsite | topsubject | hour |

The present invention employs the multilevel multidimensional analysis facility 210 derives various web access patterns from these cubes. For example, the web access patterns may be used to represent the access behavior of a single user or a collection of users. Furthermore, the web access patterns may be based on volumes or probability distributions. Also, the web access patterns may be materialized (i.e., defined as variables) or not materialized (i.e., defined as formulas). Examples of multidimensional patterns, multilevel patterns, and probability distribution based patterns are now described.

Multidimensional Patterns

A cube representing the access volumes by hour for the most popular subjects and top referring sites from users in France, can be defined by the following formula (view) and derived from cube Expvolume.top by the following expression:

define VolFromFrance.topformula int <hour, toprefsite, topsubject>

EQ EXPvolume.top(toporigin 'France').

Multilevel Patterns

Using the relations origin_ip, refsite_ref, and subject_uri, one can "drill down" from a specific cell in cube EXPvolume.high, EXPvolume.high(hour '12', origin 'France', refsite 'www.yahoo.com/', subject 'www.exp.com/EXP/TODAY') to identify a subcube of EXPvolume, through the following operations:

limit ip to origin_ip 'France' limit ref to refsite_ref 'www.yahoo.com' limit uri to subject_uri 'EXP/TODAY' limit hour to '12' report EXPvolume.

Probability Distribution Based Patterns

Cubes representing probability distribution based patterns are derived from volume-based pattern cubes. Probability distribution based patterns cubes provide fine-grained representation of dynamic behavior. Given cube EXPvolume.high, for example, the volume cube dimensioned by hour and subject may be defined by the following:

define VolByHourBySubjectformula int <hour, subject>

EQ total(EXPvolume.high, hour, subject).

The cube representing probability distributions of the above information over all hits may be expressed as define VolByHourBySubject.dist1 formula decimal <hour, subject>

EQ total(EXPvolume.high, hour, subject)/total (EXPvolume.high).

Furthermore, conditional probability distributions over the hits per subject may be expressed as define VolByHourBySubject.dist2 formula decimal <hour, subject>

EQ total(EXPvolume.high, hour, subject)/total (EXPvolume.high, subject).

In the actual implementation, some of the above cubes are materialized for computation efficiency. However, for consistency, it is only necessary to store volume cubes persistently in the data-warehouse. Derived patterns, either materialized or not, can be generated at analysis time.

Multi-level and Multidimensional Feature Ranking

Feature ranking, such as the top ten Web sites being accessed, is important for such applications as targeted advertising. Web access ranking can be represented from different angles. For example, given a particular web site, one may be interested in ranking the hits to the web site by companies, areas and time. Some access patterns might be similar in the volume of hits. Other access patterns may be similar in their distribution over the total hits or over the hits in a specific hour. The feature ranking facility 240 of the present invention enables the ranking of Web access along multiple dimensions and at multiple levels. A feature is represented by a dimension.

Given a volume cube, ranking on a feature (e.g., dimension) is represented by a pair of cubes: a first cube for a ranked list of elements of that dimension, and a second cube for the corresponding volume or probability measures from which the ranking was computed. Consider the cube, Expvolume.top dimensioned by hour, toporigin, toprefsite, topsubject. The ranking of top N subjects dimensioned by origin sites, referring sites, and hour, may be represented by the following pair of cubes define subject_tp.list variable text <order hour toprefsite toporigin> define subject_tp.perc variable dec <order hour toprefsite toporigin> where "order" is a dimension containing ranks 1, 2, . . . , N.

In general, the multidimensional ranking information for a feature X is kept in a pair of ranking cubes dimensioned by O, $A_1, A_2 \ldots A_n$, say $R_x[O, A_1, A_2 \ldots A_n]$ and $R'_x[O, A_1, A_2 \ldots A_n]$. The ranked elements of X are kept as cell values of $R_x$, and the corresponding measure values (volume or percentage) are kept as cell values of $R'_x$. O is the dimension for ordered numbers 1,2, . . . , N. Typically these two cubes are computed from a measure cube with X and other dimensions related to $A_1, A_2 \ldots A_n$, denoted by $C[X, A'_1, A'_2 \ldots A'_m]$.

For example, consider a situation where area is a dimension of $R_x$, and user is a dimension of C. In this case, dimensions area and user may be related in such a way that an area value, say 'California', corresponds to the set of users in California, thereby identifying a subcube of C. The general algorithm is now described.

In nested loops, the first step is to focus on each subcube of $R_x[O, A_1, A_2 \ldots A_n]$ on dimensions $A_1, A_2 \ldots A_n$, say $R_x(A_1=a_1, A_2=a_2, \ldots A_n=a_n)$, that is dimensioned by O, denoted $R_{xs}[O]$. The next step is to map $R_{xs}[O]$ to a subcube of C, (e.g., $C_s$,) that is dimensioned by all dimensions except X. The next step is to generate a sorted list of X elements based on the measure values of $C_s$, and assign them to $R_{xs}[O]$. The corresponding measures, which may, for example be, in volume or percentage, are assigned to the counterpart sub-cube of $R'_x$.

Correlation Analysis

An important aspect of Web access analysis is to understand the correlation between different factors, such as between origin sites and subjects. The correlation between different factors can be represented as association rules. A publication entitled, "OLAP-based Scalable Profiling of Customer Behavior", by Q. Chen, U. Dayal, M. Hsu, Proc. Of 1st International Conference on Data Warehousing and Knowledge Discovery (DAWAK99), Italy 1999, describes an approach to use cube operations to mine association rules including scoped, multilevel, multidimensional rules. The correlation analysis facility 250 of the present invention generates rules with flexible bases and time-variant rules and further applies these rules to web access analysis.

Multilevel Association Rules with Flexible Base and Dimensions

Association rules provide a quantitative measurement of the correlation between facts. For example, if 50% of the origin sites for accesses to pages belonging to some specific subject are via referring site www.yahoo.com, and only 10% of all these origin sites use Yahoo as a referring site, we say that the association rule has confidence 50% and support 10%. Given minimum support and confidence thresholds, a rule is considered strong if it satisfies these thresholds.

An association rule has an underlying base B that defines the population over which the rule is defined. For example, the correlation between subjects (i.e. target sites) and referring sites can be based on accesses, as x∈WLRs: contain_subject(x, S) ⇒ contain_refsite(x, R), or based on origin site, as x∈origins: access_subject(x, S) ⇒ via_refsite(x, R), regardless of whether the navigation occurs in the same session or not. In this example, the association rule uses binary predicates with the first place denoting a base element and the second place denoting an item.

Q. Chen, U. Dayal, M. Hsu, "OLAP-based Scalable Profiling of Customer Behavior", Proc. Of 1st International Conference on Data Warehousing and Knowledge Discovery (DAWAK99), Italy 1999, also describes how to represent multidimensional and multilevel association rules using cubes. For example, the cube $C_v$[time, origin, refsite, subject] contains sufficient information for deriving association rules between referring sites and subjects (target sites). For example, rules can be defined that are dimensioned by, and at different levels of time and origin_area, such as

[x∈origins: access_subject(x, S) ⇒ via_refsite(x, R)]‖ time='January 1999', origin_area='CA'

[x∈origins: access_subject(x, S) ⇒ via_refsite(x, R)]‖ time='Year 1999', origin_area='USA'

The above data cube also contains sufficient information for deriving rules that express the correlation between subjects. An example of such a rule is as follows:

[x∈origins: access_subject(x, A) ⇒ access_subject(x, B)]‖ time='Oct. 01, 1999', origin_area='UK'

A given volume cube such as $C_v$ (time, origin, refsite, subject) is received. Based on the volume cube, a base cube $C_b$ (refsite, origin_area), a population cube $C_p$ (subject, refsite, origin_area), and an association cube $C_a$ (subject, subject2, refsite, time, origin_area) are computed. These cubes are then utilized in turn to derive support and confidence cubes. It is noted that the association cube includes a new dimension subject2, which has the same elements as subject, and its measure is the count of base elements corresponding to each combination of subject and subject2.

Time-variant Association Rules

In the above association rules, only the elements of the time dimension are considered. In reality, rules with respect to time-variant predicates may be more interesting, such as a rule that relates accesses (based on origin sites) to subjects A and B within the same day, [x∈origins: access_subject(x, A) ⇒ access_subject(x, B)]‖ time='sameday', . . .

This rule concerns a predicate over the time dimension, which is modeled as a special dimension called time-slot.

The volume cube for computing association rules dimensioned by generic time-slots (e.g. same-day or same-week) is the same as defined above. The association, support, and confidence cubes are dimensioned by time-slot. It is noted that there is no need to dimension the population cube and base cube by time-slot since they are the same with respect to all time-slot elements. The definitions of these cubes are shown below.

association cube: $C_a$ (subject, subject2, refsite, time-slot, origin_area)

population cube: $C_p$ (subject, refsite, origin_area)

base cube: $C_b$ (refsite, origin_area)

confidence cube: $C_f$ (subject, subject2, refsite, time-slot, origin_area)

support cube: $C_s$ (subject, subject2, refsite, time-slot, origin_area)

The computation of a rule dimensioned by generic time-slots differs from the computation of a rule dimensioned by time instants in the following aspects.

Time Bins: For rules dimensioned by generic time-slots, the time bins are not particular time elements such as hours or days, but rather time predicates. For instance, from an origin site, the accesses to subjects A and B in any week are mapped to the time slot element "same-week".

Duplicate Elimination: The base elements of rules (e.g. origin sites) are not repeatedly counted for a generic time-slot. For example, an origin site from which subjects A and B are accessed multiple times within the same day, or within the same day on multiple days, only contributes one count to same-day access.

The handling of population and support cubes is also different, since they have no time-related dimensions as described above.

Accordingly, the algorithm for mining association rules dimensioned by generic time-slots includes the following additional or different steps from the algorithm described in the publication entitled, "A Distributed OLAP Infrastructure for E-Commerce", by Q. Chen, U. Dayal, M. Hsu, Proc. Fourth IFCIS Conference on Cooperative Information Systems (CoopIS'99), 1999, UK.

For each generic time slot (e.g., same-day), limit time instance accordingly. For example, the time instance may be limited to all days, excluding weeks.

The population cube $C_p$ is instantiated with the dimensioned total counts of origin sites in each origin_area, with respect to subject, refsite, origin and based on the antecedent condition $C_v$ (subject A)>0. The base cube $C_b$ is instantiated with the dimensioned total counts of origin sites with respect to refsite and origin_area.

In calculating the association cube $C_a$ with respect to each pair of subject, subject2, instead of counting the total origin sites that satisfy the association condition $C_v$ (subject A)>0 and $C_v$ (subject2 B)>0, for each origin site in a loop, determine whether each origin site satisfies that condition in any time instance belong to that time slot (e.g. any day). When an origin site satisfies that condition in any time instance belong to that time slot does, count the origin site once only.

Under the new definitions of these cubes, confidence cube and support cube are still computed by the cell-wise operations $C_f=C_a/C_p$ and $C_s=C_a/C_b$.

Overall Performance Comparison

In summary, the web access analysis mechanism of the present invention represents Web access volumes by separate volume cubes, a BVC (e.g., EXPvolume cube), an HDC (e.g., EXPvolume.high cube), and a HPC (e.g., EXPvolume.top). TABLE IV shows how data can be reduced with the approach of the present invention, thereby improving scalability. As can be appreciated, without the data reduction provided by the present invention, performing Web access analysis with OLAP is not practical.

TABLE V shows that the present invention dramatically outperforms the conventional approach. The comparison illustrates the practical value of the web access analysis of the present invention for handling the present application. The present invention provides low-level details as measured by BVC and high-level summaries as measured by HDC and HPC, as well as, links between these cubes as measured by the relations between corresponding dimension elements. It is noted that information not directly covered by these cubes may be computed by queries involving relatively inexpensive sub-cube manipulations.

TABLE IV

DIMENSION SIZES

| | | | | | |
|---|---|---|---|---|---|
| Ip | 48,128 | origin | 90 | toporigin | 35 |
| Uri | 18,085 | subject | 229 | topsubject | 32 |
| Ref | 10,432 | refsite | 2,167 | toprefsite | 25 |
| Hour | 24 | hour | 24 | hour | 24 |

CUBE SIZES

| | | | | | |
|---|---|---|---|---|---|
| EXPvolume | 217,919 billion | EXPvolume. high | 1.6 billion | EXPvolume. top | 0.000672 billion |

TABLE V

CONVENTIONAL APPROACH

| | |
|---|---|
| Loading cube EXPvolume | 1 hour |
| Rollup Expvolume (by estimation) | 10,000 hours |
| Total estimated time | 10,000 hours |

PROPOSED APPROACH

| | |
|---|---|
| Loading Expvolume | 1 hour |
| Direct binning Expvolume.high | 1.2 hour |
| Generating EXPvolume.top | 0.3 hour |
| Total time | 2.5 hour |

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method for analyzing web access comprising:
   receiving a plurality of web log records;
   providing a scalability enhancement mechanism for efficiently summarizing data;
   employing the scalability enhancement mechanism for generating multi-dimensional summary information based on the plurality of web log records; and
   performing derivation and analysis to discover usage patterns and rules for supporting business intelligence by using the multi-dimensional summary information;
   wherein providing a scalability enhancement mechanism for efficiently summarizing data includes
   providing a diagonal aggregation facility for generating a high diagonal cube and using the high diagonal cube to perform diagonal aggregation without rollup.

2. The method of claim 1 wherein performing derivation and analysis to discover usage patterns and rules for supporting business intelligence includes one of usage analysis, web site traffic analysis, and business rules discovery.

3. The method of claim 1 further comprising:
   performing multilevel and multidimensional analysis on the summary information to generate one of multidimensional patterns, multilevel patterns, and probability based patterns.

4. The method of claim 1 further comprising:
   generating multilevel and multidimensional feature ranking cubes for ranking web access along multiple dimensions and at multiple levels.

5. The method of claim 4 wherein generating multilevel and multidimensional feature ranking cubes for ranking web access along multiple dimensions and at multiple levels includes:
   generating a first cube for ranked list of elements of a particular dimension, where a feature is represented by a dimension; and
   generating a second cube for one of volume and probability distribution corresponding to the ranked list of elements of a particular dimension.

6. The method of claim 1 further comprising:
   performing correlation analysis on the summary information to generate association rules for use in web access analysis.

7. The method of claim 6 wherein performing correlation analysis on the summary information to generate association rules for use in web access analysis includes generating one of multilevel association rules with flexible base and dimensions and time-variant association rules.

* * * * *